Barrett B. Russell 3rd. Inventor

Barrett B. Russell 3rd. Inventor
By H. M. Feyrer Attorney

June 17, 1947.  B. B. RUSSELL, 3D  2,422,262
APPARATUS FOR CONTACTING SOLID PARTICLES WITH GASEOUS FLUIDS
Filed Aug. 2, 1944  3 Sheets-Sheet 3

Barrett B. Russell 3rd, Inventor
By H. M. Feyrer Attorney

Patented June 17, 1947

2,422,262

UNITED STATES PATENT OFFICE 2,422,262

APPARATUS FOR CONTACTING SOLID PARTICLES WITH GASEOUS FLUIDS

Barrett B. Russell, 3d, Elizabeth, N. J., assignor to Standard Oil Development Company, a corporation of Delaware Application August 2, 1944, Serial No. 547,665

8 Claims. (Cl. 23—288)

1

This invention relates to contacting solid particles in subdivided form with gaseous fluids, and more particularly, relates to the stripping of spent or contaminated catalyst or contact particles following a hydrocarbon catalytic conversion operation.

In the catalytic cracking of hydrocarbons, it is known that coke or carbonaceous material is deposited on the catalyst particles and the catalyst or contact particles must be regenerated as by burning with air to remove the coke or carbonaceous deposits. Associated with the spent or contaminated catalyst or contact particles are entrained hydrocarbon vapors and gases. In addition, some hydrocarbon vapors and gases are adsorbed on the adsorbent catalytic or contact material and this adsorbed material may be at least partly removed with a stripping gas such as steam.

In the first units built for the catalytic conversion of hydrocarbons using powdered or subdivided catalyst, the reaction products in vapor form and the catalyst particles are passed overhead from the reaction zone or vessel as a relatively dilute suspension and stripping is not a troublesome problem. In the newer type of unit used in the catalytic cracking of hydrocarbons where the spent or contaminated catalyst particles are withdrawn from the bottom of the reaction zone in a relatively dense dry fluidized liquid-simulating condition and the catalyst is then stripped, incomplete stripping has been obtained.

As the spent or contaminated catalyst or contact particles are withdrawn in a dense phase, apparently there is more entrainment of hydrocarbon vapors and gases and more adsorption of hydrocarbon vapors and gases on the catalyst or contact particles. With incomplete stripping, more combustible material is added to the regeneration zone and more carbonaceous material must be burned. This results in a higher loss of feed stock as coke or carbonaceous material which is burned in the regeneration zone, and in addition, more heat is generated in the regeneration zone than is required for the process.

According to my invention, the catalyst or contact particles being withdrawn in a dense fluidized dry liquid simulating condition are passed through an annular stripping section or zone below the conversion or cracking zone, the stripping zone or section being subdivided into two or more concentric stripping sections. One or more vertical cylinders or partitions are concentrically arranged in the usual annular stripping zone to form two or more annular stripping zones of substantially equal volume.

To further improve the stripping efficiency, baffle means may be introduced into one or more of the annular stripping zones. Such baffle means may be a vertically alternating single annular and two part annular construction, for example, but other solids-gas contacting apparatus may be used. With the vertically alternating single annular and two part annular baffle construction, agitation and mixing are increased and localized points of high velocity are obtained.

Further improvement in the stripping efficiency may be obtained by injecting the stripping gas perpendicularly away from the faces of the annular baffles. In this way a transverse flow of stripping gas is obtained through the descending mass of spent or contaminated catalyst or contact particles. Such stripping may also be used in a single baffled annular stripping section with the cylindrical partition omitted and improved results obtained over the unbaffled annular stripping section using countercurrent stripping only.

Figure 1:
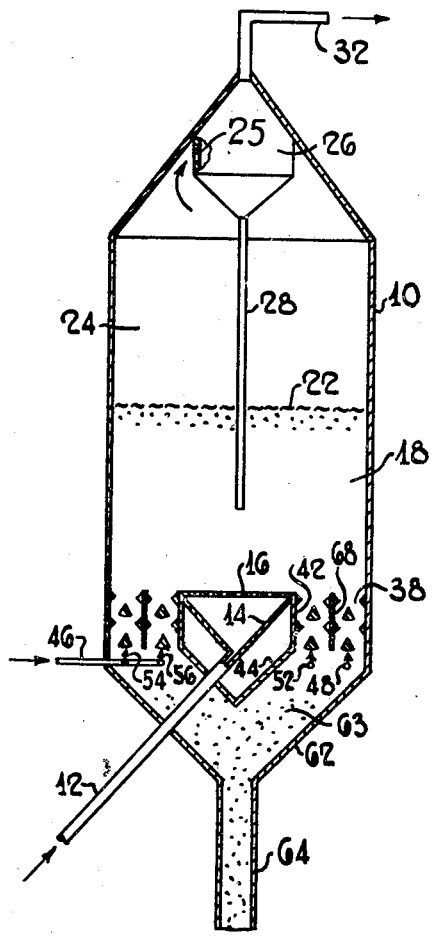
Fig. 1 represents a vertical longitudinal cross-section of one form of apparatus adapted to be used in carrying out my invention.

Referring now to the drawing, the reference character 10 designates a cylindrical vessel provided with an inlet 12 for introducing gaseous fluid or a mixture of gaseous fluid and catalyst or contact particles in subdivided form. The gaseous fluid from line 12 is introduced into the cone 14 arranged in the lower portion of the reaction vessel 10 and provided with a distribution plate 16 whereby solids and gaseous fluid are evenly distributed across the area of the reaction vessel. The velocity of the gaseous fluid is selected to maintain the solid particles in a dry dense fluidized liquid-simulating condition as shown at 18 having a level indicated at 22. The particles are maintained in a turbulent condition and exceedingly good mixing and agitation are obtained.

In the catalytic cracking of hydrocarbons the gaseous fluid introduced through line 12 may comprise gas oil and vapors or other hydrocarbon vapors which are to be converted or cracked. Instead of using vapors, hot regenerated catalyst may be mixed with liquid hydrocarbon oils, such as crude oil, reduced crude oil, gas oil, naphtha, etc., a sufficient amount of hot regenerated catalyst being used to vaporize the oil and raise it to conversion temperature.

In the catalytic cracking of hydrocarbons any suitable cracking catalyst may be used as, for example, acid-treated bentonite clay, synthetic silica alumina gels, synthetic silica magnesia gels, etc. Preferably the catalyst is used in powdered form having a size between about 200 and 400 standard mesh but coarser catalyst may be used if desired. Using acid-treated bentonite clay or synthetic silica alumina gel in powdered form, the density of the mixture shown at 18 may vary between about 10 lbs./cu. ft. and 40 lbs./cu. ft., depending on the velocity of the vapors or gases passing upwardly through the mixture or bed 18. The velocity may range between about ½ ft./second and 2 ft./second, the lower velocities giving higher densities in the bed or mixture 18.

Above the dense bed or mixture 18 is a dilute phase in which the gaseous fluid or reaction products in vapor form contain only a small amount of entrained catalyst or contact particles. The gaseous fluid from the dilute phase 24 is passed through inlet 25 of a separating means 26 arranged in the upper portion of the reaction vessel 10. The separating means 26 separates most of the entrained catalyst or contact particles from the gaseous fluid passing upwardly through the reaction vessel 10. The separated catalyst or contact particles are returned to the dense bed or mixture 18 through line 28 which dips below the level 22 in the reaction vessel 10.

The gaseous fluid or vaporous reaction products leave the top of the reaction vessel 10 through line 32 and may be passed to any suitable equipment for recovering desired products. In the catalytic cracking of hydrocarbons the cracked vaporous products are preferably passed to a fractionating tower to separate gasoline from gases and higher boiling hydrocarbons. The separating means is shown in the drawing as a cyclone separator but other separating means may be used as, for example, a Multiclone separator.

During the catalytic cracking or conversion of hydrocarbons, the catalyst or contact particles become contaminated or spent by the deposition on the particles of coke or carbonaceous material. This carbonaceous or combustible material must be removed before the catalyst is used over again in another cracking or conversion operation. The contaminated or spent catalyst or contact particles are withdrawn from the bottom of the dense bed or mixture 18 and passed downwardly through a stripping or purging section generally indicated at 38.

The usual purging section is annular in form and is formed by the inner wall of the vessel 10 and a skirt or apron 42, which descends from the distribution plate 16. The bottom of the apron or skirt 42 may be closed as shown by cone-shaped bottom 44 to eliminate any possibility of pockets forming between the feed cone inlet 14 and the skirt or apron 42. My invention comprises an improved stripping or purging section and will be presently described in connection with the detailed view shown in Fig. 2.

Stripping gas, such as steam, superheated to about 250° F. to 1100° F. is introduced through line 46 and passed through annular distributing lines 48 and 52 into the bottom portion of the stripping section 38. Line 48 is provided with nozzles 54 and line 52 is provided with nozzles 56 for introducing the stripping gas at a plurality of points into the bottom portion of the stripping section 38. The catalyst or contact particles during stripping and during passage through the stripping section are maintained in a relatively dense dry fluidized liquid-simulating condition.

The stripped particles flow down into the conical bottom portion 62 of the reaction vessel 10 and are collected therein as a dense fluidized mixture shown at 63 from which they pass to a standpipe 64. Only a portion of the standpipe is shown in Fig. 1. The stripped particles are maintained in a dense fluidized condition in the standpipe to produce a hydrostatic pressure at the base of the standpipe which is sufficiently high to move the stripped spent catalyst particles to an air stream which carries the catalyst to a regeneration zone (not shown).

Figure 2:
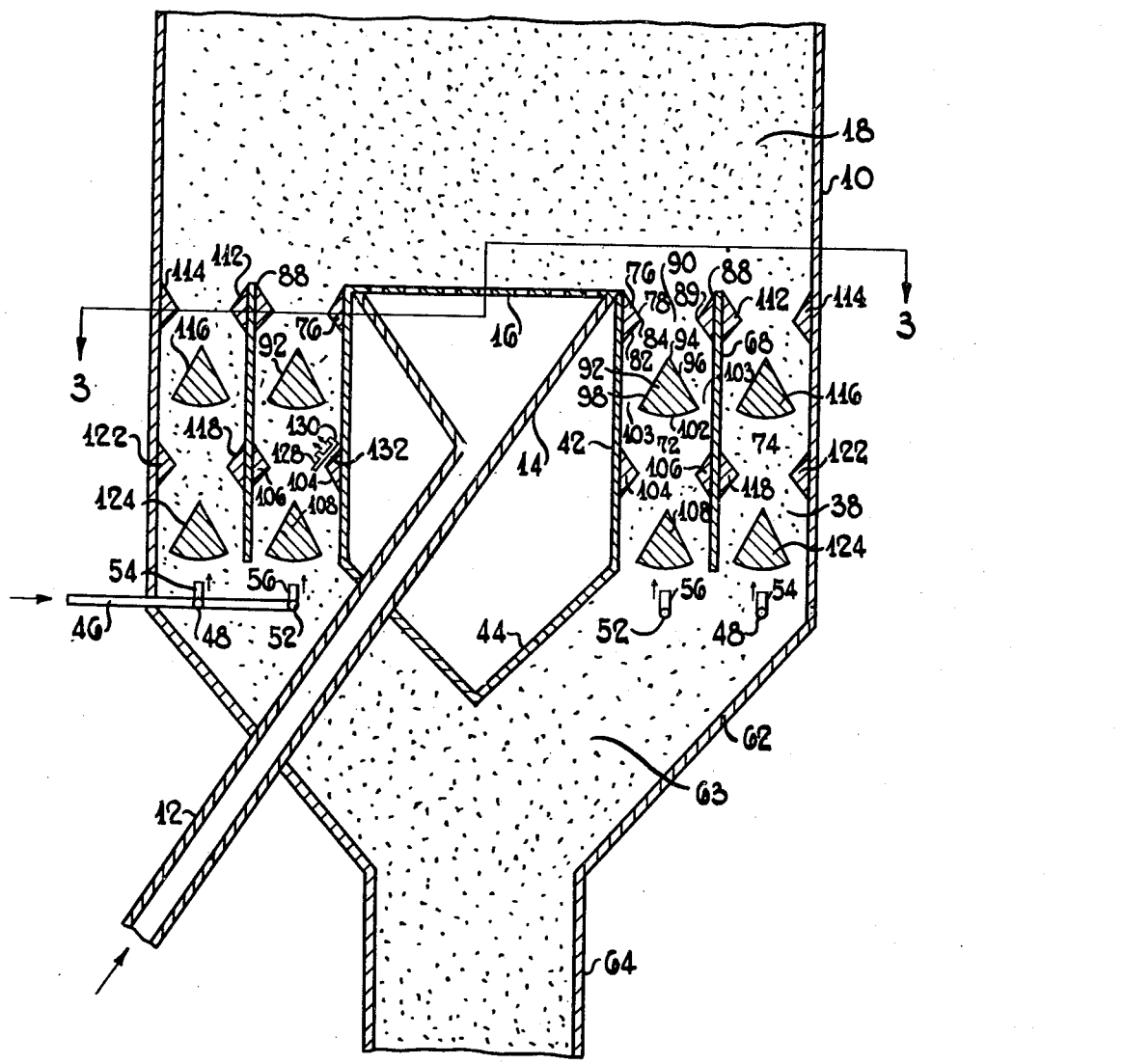
Fig. 2 represents an enlarged vertical longitudinal cross-section of the lower portion of the apparatus shown in Fig. 1.

Referring now to Fig. 2 of the drawing, it will be seen that my improved stripping section 38 includes a cylindrical baffle or partition 68 which is concentric with the apron or skirt 42 and with the wall of the reaction vessel 10. The cylindrical baffle or partition 68 subdivides the annular stripping section into two smaller annular stripping sections 72 and 74 which are concentrically arranged. Nozzles 54 feed stripping gas into section 74 and nozzles 56 feed stripping gas into section 72. The cylindrical partition or baffle 68 is so positioned that the volumes of the stripping sections 72 and 74 are substantially equal. The two stripping sections 72 and 74 give better stripping than the same stripping section with the cylindrical partition or baffle 68 removed.

Figure 3:
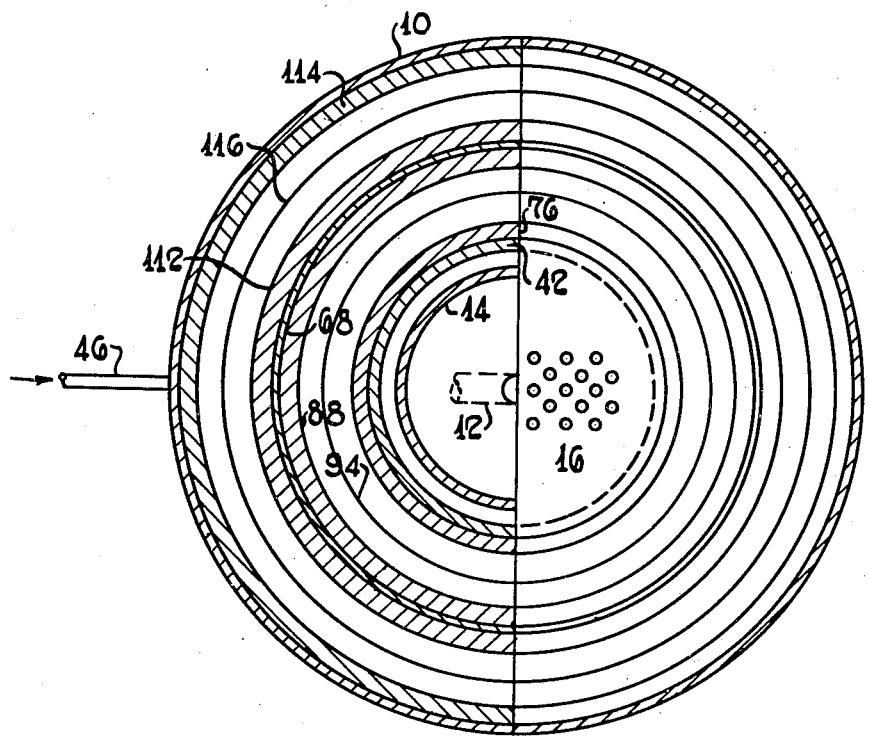
Fig. 3 represents a partial horizontal transverse cross-sectional view taken on line 3—3 of Fig. 2.

In order to further improve stripping, I have included a baffle construction in each of the smaller stripping sections. Such baffle construction in the vertical section shown in Figs. 1 and 2 resembles a disc and doughnut construction and the baffle construction shown functions in a way similar to a disc and doughnut baffle construction. As the stripping section is annular, the elements of the baffle construction are also annular as will be seen from an inspection of Figs. 2 and 3. One portion of the top two-part baffle is shown at 76, the element being triangular in cross-section with the base thereof secured to the apron or skirt 42 and the remaining faces 78 and 82 coming to an apex at 84. The element 76 is arranged in the upper part of the stripping section 72.

The other portion of the top two-part baffle is shown at 88 and from the drawing it will be seen that it is similar in construction to the other portion of the two-part baffle 76 just described. The apex 84 of the one baffle section 76 and the apex 89 of the other baffle section 88 are directed toward each other and form a narrower annular passageway 90 in the stripping section 72. As the dense mixture to be stripped passes through the narrowed passageway 90, there is increased agitation and a higher velocity of the stripping gas so that improved stripping is obtained.

Arranged below the two-part baffle construction 76, 88 is a single annular baffle 92 which is substantially triangular in cross-section and has a pointed top or apex 94 and diverging sides 96 and 98. The bottom of the baffle 92 is shown as curved at 102 but may be a straight line. The apex 94 is arranged at the top of the baffle directly beneath the narrowed passageway 90 above described so that the dense mixture is divided into two streams as it passes downward over the baffle 92. The bottom portion of the baffle 92 forms narrowed passageways 103 adjacent the bottom 102 of the baffle 92 and here again, increased agitation and higher velocities are obtained.

Arranged below the baffle 92 is another two-part baffle construction comprising elements 104 and 106 which are similar in construction to the two-part baffle construction 76, 88 above described. Arranged below the baffle construction 104, 106 is another single annular baffle construction 108 which is similar to the baffle 92 above described.

The other stripping section 74 is provided with a top two-part baffle construction 112, 114 which is similar in construction to the two-part baffle construction 76, 88 above described. Below this baffle construction 112, 114 is a single annular baffle 116 which is similar to the baffle 92 above described. Below the baffle 116 is another two-part baffle construction 118 and 122 which is similar to the two-part baffle construction 76, 88 above described. Below the two-part baffle construction 118, 122 is another single annular baffle 124 similar to the baffle 92 above described.

While I have described my improved stripping section as being formed by subdividing the usual stripping section into two smaller concentric stripping sections, it is to be understood that more than one concentric cylindrical baffle may be used to subdivide the usual stripping section into a plurality of smaller concentric stripping sections. Such smaller stripping sections give improved stripping over the usual single annular stripping section. The stripping is further improved by including the baffle construction above described including the two-part baffles and the single annular baffles.

The nozzles for introducing stripping gas have been shown at 54 and 56 and preferably the nozzles are arranged around the bottom of the stripping section so that stripping gas is introduced into the bottom portion of each of the separate stripping portions 72 and 74 around the entire bottom of each section.

If desired, the stripping efficiency in the separate stripping sections may be further increased by introducing a stripping gas perpendicularly away from the face of the baffles. This is shown in Fig. 2 in connection with one section of the two-part baffle construction but may be used on any number of such baffles desired. As shown in Fig. 2, an inlet line 128 is provided with branch lines 130 which direct the stripping gas perpendicularly to the slanting side 132 of the baffle construction 104. With such stripping the stripping gas passes at right angles to the downflowing mixture to be stripped and better stripping is obtained.

The stripping gas may comprise superheated steam or other inert gases such as carbon dioxide, nitrogen, etc., also recycle gas, $CH_4$, $C_2H_6$, $C_3H_8$, $H_2$, $C_4H_{10}$.

In the catalytic cracking of hydrocarbons, the temperature in the reaction vessel 10 may vary between about 850 and 1100° F. but different temperatures may be used for other hydrocarbon conversion operations or other processes involving chemical reactions. The catalyst to oil ratio may vary between about 5 to 1 to 35 to 1 by weight.

The velocity of the stripping gas passing upwardly through the separate stripping sections is so selected that the downflowing mixture is maintained in a relatively dense fluidized condition. While there may be portions of the mixture of lighter density, the average density of the fluidized mixture passing through the stripping zones when using synthetic silica alumina powdered catalyst may vary between about 10 lbs./cu. ft. and 30 lbs./cu. ft. The velocity of the stripping gas may be between about 0.1 ft./second to 1.5 ft./second, preferably about 0.3 ft./second to 0.6 ft./second.

To determine the stripping efficiency, a screen sampling device is used which allows separation of the hot vapors from the catalyst followed by condensation and separation of the gaseous components at atmospheric conditions. Oil and water are condensed and gas is metered. Perfect stripping would show only water. No stripping would show gas and oil, no water. Using my invention, the efficiency of the stripping step can be increased to about 95% to 100%. This means that about 95 to 100% of the condensible hydrocarbons obtained in the above step are removed during stripping.

The hydrocarbon constituents which are removed during the stripping step are passed upwardly into the dense bed or mixture 18 in the reaction vessel 10 and are recovered with the products passing overhead through line 32.

The following data show that increased stripping efficiency is obtained when using smaller diameter stripping sections or sections having a smaller cross-sectional area, but the same length. The catalyst flow density in each case is 275 lbs./sq.ft./min.

6" unbaffled stripper

| | | | |
|---|---|---|---|
| Relative velocity (feet/sec.) of the gas with respect to the catalyst | 0.38 | 0.72 | 0.90 |
| Efficiency % | 95 | 99 | 100 |

12" unbaffled stripper

| | | | |
|---|---|---|---|
| Relative velocity (feet/sec.) of the gas with respect to the catalyst | 0.55 | 0.71 | 0.88 |
| Efficiency % | 87.9 | 91.3 | 94 |

While my invention has been specifically described in connection with catalytic cracking of hydrocarbons, it is to be understood that it is also useful in other operations where it is desired to remove a volatile material from spent or contaminated catalyst or contact particles in other reactions. My invention is not to be limited to the specific conditions nor to the specific process described as these are given by way of illustration only and various changes and modifications may be made without departing from the spirit of my invention.

I claim:

1. An apparatus of the character described including a cylindrical vessel, a centrally arranged circular distribution perforated plate in the lower portion of said vessel, means for introducing gaseous fluid into said vessel for passage upwardly through said plate, a skirt depending from the perimeter of said plate and concentric with said plate and said vessel, a cylindrical baffle concentric with the wall of said vessel and with said skirt whereby a plurality of annular concentric zones are formed, means for introducing a gaseous fluid into said annular zones, said vessel being adapted to contain a dense dry fluidized liquid-simulating mixture of contact particles and gaseous fluid which mixture passes down through said annular zones wherein the contact particles are mixed with the gaseous fluid introduced into said annular zones.

2. An apparatus according to claim 1 wherein baffle means are provided in at least one of said annular zones whereby better contact is obtained between the contact particles and gaseous fluid.

3. An apparatus according to claim 1 wherein baffle means are provided in at least one of said annular zones whereby better contact is obtained between the contact particles and gaseous fluid and means are included adjacent said baffle means to inject gas transversely of the downward flow of dense mixture through at least one of said annular zones.

4. In an apparatus of the character described including a cylindrical vessel, a circular distribution perforated plate centrally arranged in the lower portion of said vessel, means for introducing gaseous fluid into said vessel for passage upwardly through said plate, a skirt depending from the perimeter of said plate and concentric with said plate and said vessel, the improvement including a cylindrical baffle concentric with the wall of said vessel and with said skirt to subdivide the zone between said skirt and said wall into a plurality of annular concentric zones, means for introducing a gaseous fluid into each of said annular zones, said vessel being adapted to contain a dense dry fluidized liquid-simulating mixture of contact particles and gaseous fluid which mixture passes down through said annular zones wherein the contact particles are mixed with the gaseous fluid introduced into said annular zones.

5. An apparatus according to claim 4 wherein baffle means are provided in at least one of said annular zones whereby better contact is obtained between the contact particles and gaseous fluid.

6. An apparatus according to claim 4 wherein said cylindrical baffle is so placed that the annular concentric zones have substantially the same volume.

7. An apparatus of the character described including a cylindrical vessel, a circular distribution perforated plate centrally arranged in the lower portion of said vessel, means for introducing gaseous fluid into said vessel, an annular chamber adjacent said plate and concentric therewith, a cylindrical baffle concentric with the wall of said vessel and with said plate subdividing said annular chamber into a plurality of annular concentric zones, means for introducing a gaseous fluid into the bottom portion of each of said annular zones, said vessel being adapted to contain a dense dry fluidized liquid-simulating mixture of contact particles and gaseous fluid which mixture passes down through said annular concentric zones wherein the contact particles are mixed with the gaseous fluid introduced into said annular zones.

8. An apparatus according to claim 7 wherein baffle means are provided in at least one of said annular zones whereby better contact is obtained between the contact particles and gaseous fluid.

BARRETT B. RUSSELL, 3RD.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,304,128 | Thomas | Dec. 8, 1942 |
| 2,337,684 | Scheineman | Dec. 28, 1943 |
| 2,359,310 | Hemminger | Oct. 3, 1944 |
| 2,367,694 | Snuggs | Jan. 23, 1945 |
| 2,394,814 | Snuggs | Feb. 12, 1946 |